US009030637B2

(12) United States Patent
Oh et al.

(10) Patent No.: US 9,030,637 B2
(45) Date of Patent: May 12, 2015

(54) IN-PLANE SWITCHING MODE LIQUID CRYSTAL DISPLAY AND METHOD FOR FABRICATING THE SAME

(71) Applicant: LG Display Co., Ltd., Seoul (KR)

(72) Inventors: Jae-Young Oh, Seoul (KR); Joon-Youp Lee, Seoul (KR); Hyun-Cheol Jin, Gumi (KR); Min-Jic Lee, Gumi (KR)

(73) Assignee: LG Display Co., Ltd., Seoul (KR)

( * ) Notice: Subject to any disclaimer, the term of this patent is extended or adjusted under 35 U.S.C. 154(b) by 214 days.

(21) Appl. No.: 13/656,468

(22) Filed: Oct. 19, 2012

(65) Prior Publication Data

US 2013/0040409 A1 Feb. 14, 2013

Related U.S. Application Data

(62) Division of application No. 12/247,779, filed on Oct. 8, 2008, now Pat. No. 8,319,903.

(30) Foreign Application Priority Data

Oct. 17, 2007 (KR) ........................ 10-2007-0104730

(51) Int. Cl.
*G02F 1/1343* (2006.01)
*G02F 1/1333* (2006.01)
*G02F 1/1362* (2006.01)

(52) U.S. Cl.
CPC .... *G02F 1/134363* (2013.01); *G02F 1/136213* (2013.01)

(58) Field of Classification Search
CPC .................................. G02F 1/134363
USPC .................... 349/42–43, 38, 39, 114
See application file for complete search history.

(56) References Cited

U.S. PATENT DOCUMENTS

| 6,049,365 | A | * | 4/2000 | Nakashima | ..................... 349/42 |
| 6,118,508 | A | * | 9/2000 | Park | .............................. 349/141 |
| 6,421,039 | B1 | | 7/2002 | Moon et al. | |
| 2002/0130324 | A1 | * | 9/2002 | Song et al. | ....................... 257/72 |
| 2003/0128323 | A1 | | 7/2003 | Matsumoto et al. | |

(Continued)

FOREIGN PATENT DOCUMENTS

| CN | 1591143 A | 3/2005 |
| CN | 1619393 A | 3/2005 |
| CN | 1904680 A | 1/2007 |
| JP | 2002-62542 A | 2/2002 |

(Continued)

*Primary Examiner* — Hoan C Nguyen
(74) *Attorney, Agent, or Firm* — Birch, Stewart, Kolasch & Birch, LLP

(57) ABSTRACT

A method for fabricating an in-plane switching (IPS) type liquid crystal display (LCD) device according to an embodiment includes forming gate lines arranged in a first direction and data lines arranged in a second direction substantially perpendicular to the first direction, the gate lines and the data lines defining pixel regions on an array substrate; forming a storage electrode on the array substrate; forming common electrodes extending across each pixel region; forming pixel electrodes arranged to be substantially parallel to the common electrodes, the common electrodes and the pixel electrodes being alternately arranged to generate an in-plane field in each pixel region; and forming thin film transistors (TFTs) at intersection areas of the gate lines and the data lines, each TFT including a source electrode connected to the corresponding data line, a drain electrode connected to the corresponding pixel electrode and a gate electrode.

14 Claims, 12 Drawing Sheets

(56) References Cited

U.S. PATENT DOCUMENTS

| | | |
|---|---|---|
| 2003/0133066 A1 | 7/2003 | Ono et al. |
| 2005/0099568 A1 | 5/2005 | Kim et al. |
| 2005/0140903 A1 | 6/2005 | Park et al. |
| 2006/0227276 A1 | 10/2006 | Son |
| 2007/0002244 A1 | 1/2007 | Park et al. |
| 2007/0029551 A1* | 2/2007 | Yoo et al. ............ 257/59 |
| 2007/0153193 A1 | 7/2007 | Ootsu et al. |

FOREIGN PATENT DOCUMENTS

| | | |
|---|---|---|
| JP | 2002-323706 A | 11/2002 |
| JP | 2003-207797 A | 7/2003 |
| JP | 2004-361700 A | 12/2004 |
| JP | 2006-91120 A | 4/2006 |
| KR | 10-2003-0063131 A1 | 7/2003 |
| KR | 2003-0061352 a | 7/2003 |
| KR | 10-2006-0107872 A | 10/2006 |
| TW | 200700803 A | 1/2007 |

* cited by examiner

US 9,030,637 B2

IN-PLANE SWITCHING MODE LIQUID CRYSTAL DISPLAY AND METHOD FOR FABRICATING THE SAME

This application is a Divisional of copending application Ser. No. 12/247,779 filed on Oct. 8, 2008, which claims priority to Application No. 10-2007-0104730 filed in Korea, on Oct. 17, 2007. The entire contents of all of the above applications are hereby incorporated by reference.

BACKGROUND OF THE INVENTION

1. Field of the Invention

The present invention relates to an in-plane switching (IPS) mode liquid crystal display (LCD) and its fabrication method, and more particularly, to an IPS mode LCD and its fabrication method capable of improving an aperture ratio, a production yield and other features.

2. Description of the Related Art

As the consumer's interest in information displays is growing and the demand for portable (mobile) information devices is increasing, research and commercialization of light and thin flat panel displays ("FPD") have been growing.

Among FPDs, the liquid crystal display ("LCD") is a device for displaying images by using optical anisotropy of a liquid crystal. LCD devices exhibit excellent resolution and color and picture quality, so it is widely applied for notebook computers or desktop monitors, and the like.

The LCD includes a color filter substrate, a first substrate, an array substrate, a second substrate, and a liquid crystal layer formed between the color filter substrate and the array substrate. The color filter substrate includes a color filter including a plurality of sub-color filters that implement red, green and blue colors, a black matrix for demarcating the sub-color filters and blocking light transmitted through the liquid crystal layer, and a transparent common electrode for applying voltage to the liquid crystal layer. The array substrate includes gate lines and data lines which are arranged vertically and horizontally to define a plurality of pixel area, TFTs (thin film transistors), switching elements, formed at respective crossings of the gate lines and the data lines, and pixel electrodes formed on the pixel areas.

The color filter substrate and the array substrate are attached in a facing manner by a sealant formed at an edge of an image display region to form a liquid crystal panel, and the attachment of the color filter substrates and the array substrate is made by an attachment key formed on the color filter substrate or the array substrate.

The above-described LCD is referred as a twisted nematic (TN) mode LCD in which nematic phase liquid crystal molecules are driven in a direction perpendicular to the substrates, which has shortcomings in that its viewing angle is quite narrow, about 90°. This results from refractive anisotropy of liquid crystal molecules because when voltage is applied to a liquid crystal display panel, liquid crystal molecules which have been aligned horizontally to the substrates become aligned substantially in the vertical direction to the substrates.

Thus, an in-plane switching (IPS) mode LCD, in which liquid crystal molecules are driven in a horizontal direction to the substrates to thereby improve the viewing angle by more than 170°, has been proposed. The IPS mode LCD is described as follows.

FIG. 1 is a plan view showing a portion of an array substrate of the related art IPS mode LCD. The N number of gate lines and the M number of data lines are formed to cross each other to define the M×N number of pixels on an array substrate. However, only one pixel is shown on the drawing merely for the sake of brevity. FIG. 2 is an exemplary view showing a section take along the line I-I' of the array substrate in FIG. 1, in which the array substrate and the color filter substrate attached to the array substrate are shown together.

As shown in FIGS. 1 and 2, a gate line 16 and a data line 17 are formed vertically and horizontally to define a pixel region on the transparent array substrate 10, and a TFT (T), a switching element, is formed at the crossing of the gate line 16 and the data line 17. The TFT (T) includes a gate electrode 21 connected with a gate line 16, a source electrode 22 connected with the data line 17 and a drain electrode 23 connected with a pixel electrode 18 via a pixel electrode line 18l. The TFT also includes a first insulation film 15a for insulating the gate electrode 21 and the source and drain electrodes 22 and 23 and an active pattern 24 for forming a conductive channel between the source electrode 22 and the drain electrode 23 by a gate voltage supplied to the gate electrode 21. For reference, reference numeral 25 denotes an ohmic-contact layer for allowing source and drain regions of the active pattern 24 to ohmic-contact with the source and drain electrodes 22 and 23.

In the pixel region, a common line 8l and a storage electrode 18s are arranged in a direction parallel to the gate line 16, and a plurality of common electrodes 8 and a plurality of pixel electrodes 18 are arranged to be parallel to the data line 17. Here, the storage electrodes 18s and the common electrodes 8 generate an in-plane field 90 to switch liquid crystal molecules 30. The plurality of common electrodes 8 are simultaneously formed with the gate line 16 and connected with the common line 8l, and the plurality of pixel electrodes 18 are simultaneously formed with the data line 17 and connected with the pixel electrode line 18l and the storage electrode 18s. Further, pixel electrodes 18 connected with the pixel electrode line 18l is electrically connected with the drain electrode 23 of the TFT (T) via the pixel electrode line 18l. The storage electrode 18s overlaps with a portion of the lower common line 8l with the first insulation film 15a interposed between the storage electrode 18s and the lower common line 8l to form a storage capacitor Cst.

On the transparent color filter substrate 5, there are formed a black matrix 6 for preventing a leakage of light to the TFT (T), the gate line 16 and the data line 17, and a color filter 7 for implementing red, green and blue colors. An alignment film (not shown) for determining an initial alignment direction of the liquid crystal molecules 30 is coated on the facing surfaces of the array substrate 10 and the color filter substrate 5.

In the related art in-plane mode LCD with such a structure, the common electrodes 8 and the pixel electrodes 18 are formed on the same array substrate 10 to generate the in-plane field, and thus a viewing angle can be improved.

However, because the common electrodes 8 and the pixel electrodes 18 made of an opaque material are disposed in the pixel area, and in addition, the common lines 8l made of an opaque conductive material are provided, an aperture ratio is degraded, thus degrading luminance.

In addition, because the common line 8l is formed on the layer on which the gate line 16 is formed, near the gate line 16, the common line 8l may become short-circuited with the gate line 16.

SUMMARY OF THE INVENTION

Therefore, in order to address the above matters the various features described herein have been conceived. One aspect of the exemplary embodiments is to provide an in place switching (IPS) mode liquid crystal display (LCD) and its fabrication method capable of improving an aperture ratio by forming a plurality of common electrodes and pixel electrodes with a transparent conductive material and forming common lines such that they are substantially parallel to data lines.

Another aspect of the present invention is to provide an IPS mode LCD and its fabrication method capable of stabilizing a common voltage by reducing an overall resistance of common lines by forming the common lines in the direction of data lines shorter than overall gate lines.

Still another aspect of the present invention is to provide an IPS mode LCD and its fabrication method capable of preventing gate lines and common lines from being short-circuited by arranging the common lines such that the traverse the gate lines with an insulation film interposed therebetween.

This specification provides an embodiment of the present invention for an IPS mode LCD including gate lines arranged in a first direction on an array substrate, data lines arranged in a second direction substantially perpendicular to the first direction, the gate lines and the data lines defining pixel regions on the array substrate, at least one storage electrode provided on the array substrate, common electrodes extending across each pixel region, pixel electrodes arranged to be substantially parallel to the common electrodes, the common electrodes and the pixel electrodes being alternately arranged to generate an in-plane field in each pixel region, thin film transistors (TFTs) provided at intersection areas of the gate lines and the data lines, each TFT including a source electrode connected to the corresponding data line, a drain electrode connected to the corresponding pixel electrode and a gate electrode, and at least one common line located under the respective common electrode in the pixel region, the common line being substantially parallel to the data lines.

This specification also provides another embodiment of the present invention for a method for fabricating an IPS mode LCD, including forming gate lines arranged in a first direction and data lines arranged in a second direction substantially perpendicular to the first direction, the gate lines and the data lines defining pixel regions on an array substrate, forming a storage electrode on the array substrate, forming common electrodes extending across each pixel region, forming pixel electrodes arranged to be substantially parallel to the common electrodes, the common electrodes and the pixel electrodes being alternately arranged to generate an in-plane field in each pixel region, forming thin film transistors (TFTs) at intersection areas of the gate lines and the data lines, each TFT including a source electrode connected to the corresponding data line, a drain electrode connected to the corresponding pixel electrode and a gate electrode, and forming a common line under one of the common electrodes in the pixel region, the common line being substantially parallel to the data lines.

This specification also provides another embodiment of the present invention for a method for fabricating an IPS mode LCD, including forming a gate electrode and a gate line on a first substrate, forming a first insulating layer on the first substrate, forming an active pattern on the first substrate, forming source and drain electrodes on the first substrate and forming an data line crossing the gate line to define a pixel area, forming a storage electrode on the first substrate, forming at least one common line in a direction substantially parallel to the data line with in the pixel area of the first substrate, forming a second insulating layer on the first substrate, and forming a plurality of common electrodes and pixel electrodes alternately disposed within the pixel area of the firs substrate to generate an in-plane field, such that at least one common electrode is positioned at an upper portion of the common line.

The foregoing and other objects, features, aspects and advantages of the present invention will become more apparent from the following detailed description of the present invention when taken in conjunction with the accompanying drawings.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Figure 1:
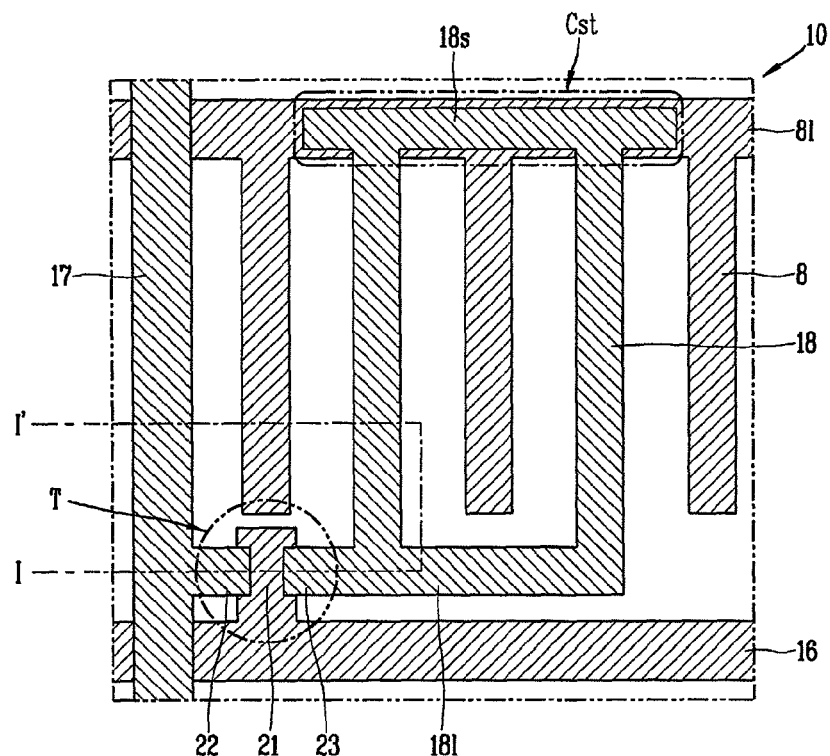
FIG. 1 is a plan view showing a portion of an array substrate of a related art in-plane switching (IPS) mode liquid crystal display (LCD)
Figure 2:
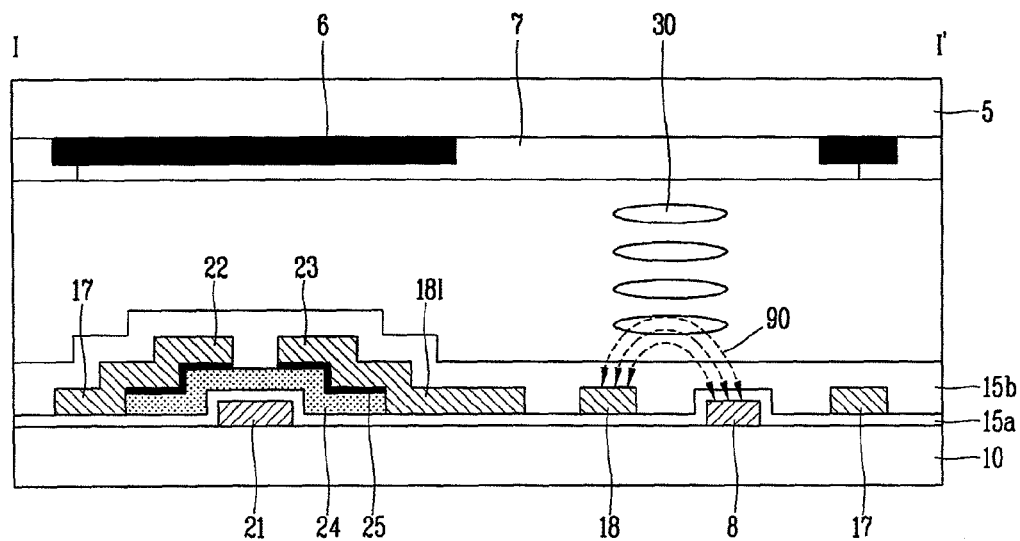
FIG. 2 is a sectional view schematically showing the structure of the related art IPS mode LCD.
Figure 3:
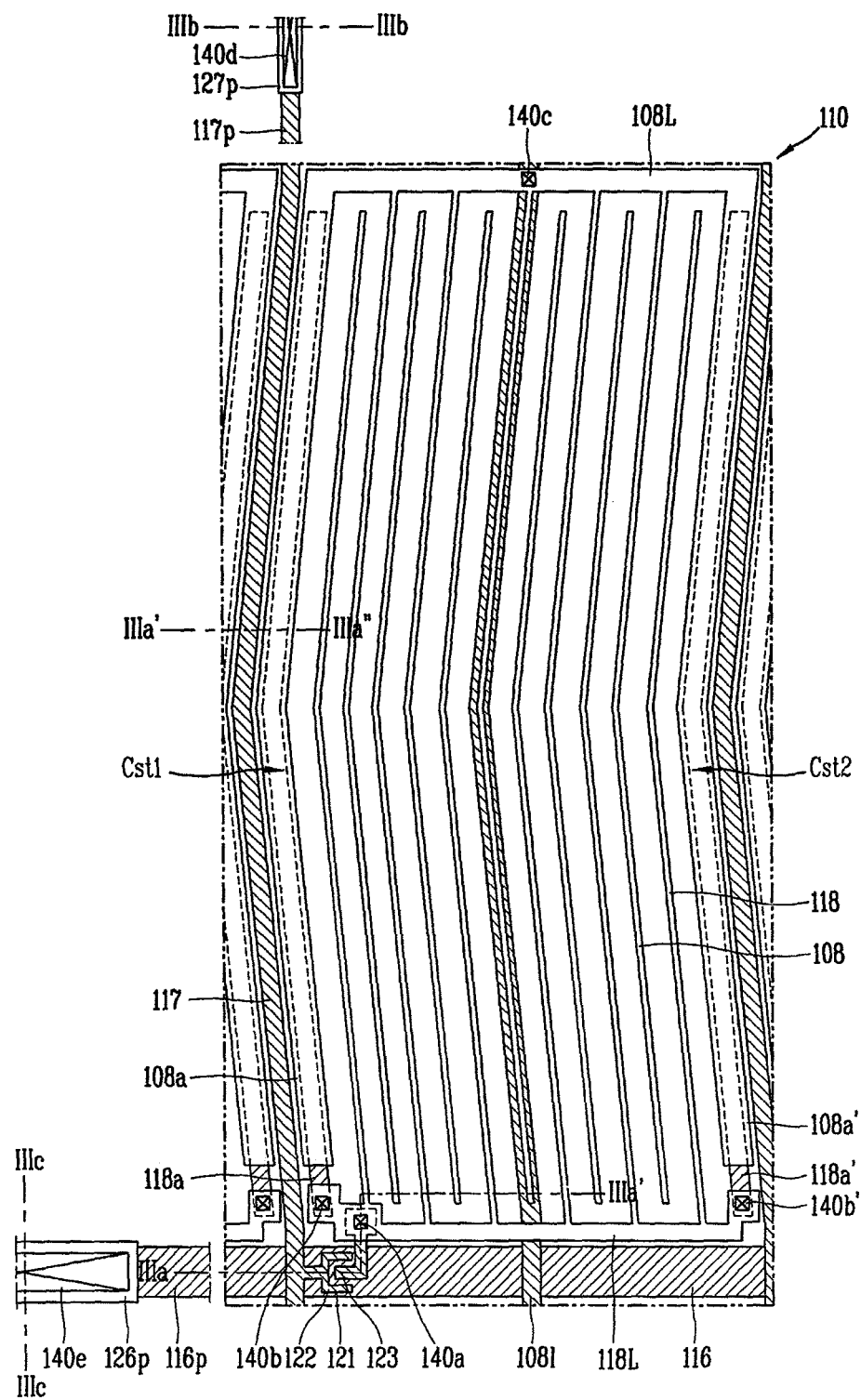
FIG. 3 is a plan view showing a portion of an array substrate of an IPS mode LCD according to a first exemplary embodiment of the present invention.

The in-plane switching (IPS) mode liquid crystal display (LCD) and its fabrication method will now be described in detail with reference to the accompanying drawings. The invention thus being described, it will be obvious that the same may be varied in many ways. Such variations are not to be regarded as a departure from the spirit and scope of the invention, and all such modifications as would be obvious to one skilled in the art are intended to be included within the scope of the following claims FIG. 3 is a plan view showing a portion of an array substrate of the IPS mode LCD according to a first embodiment of the present invention. The N number of gate lines and M number of data lines are formed to cross each other to define the M×N number of pixels on an array substrate. However, only one pixel is shown on the drawing merely for the sake of brevity.

As shown in FIG. 3, when common electrodes and pixel electrodes have a bent structure, because liquid crystal molecules are arranged in two directions to form two domains, the viewing angle can be further improved when compared with liquid crystal molecules arranged to form a mono-domain. The present invention is not limited to the two-domain structured IPS mode LCD but can be also applicable to an IPD mode LCD having multi-domain structure with more than two domains. The IPS structure forming two or more domains (multi-domain) is called an S (Super)-IPS structure. The shape of the common electrodes and the pixel electrodes to form a multi-domain structure is not limited to the drawing shown in FIG. 3. For example, the common electrodes and the pixel electrodes may have a curved structure or may have a structure bent at multiple locations.

As illustrated, in the first embodiment of the present invention, gate lines 116 and data lines 117 are formed to be arranged vertically and horizontally to define a pixel region on an array substrate 110, and a TFT (T), which is a switching element, is formed at a crossing of the gate line 116 and the data line 117.

The TFT (T) includes a gate electrode 121 forming a portion of the gate line 116, a source electrode 122 in a 'U' shape connected with the data line 117 and a drain electrode 123 connected to a pixel electrode 118. The TFT (T) further includes a first insulating layer (not shown) for insulating the gate electrodes 121 and the source and drain electrodes 122 and 123, and an active pattern (not shown) forming a conductive channel between the source and drain electrodes 122 and 123 by a gate voltage supplied to the gate electrode 121. In this case, although the source electrode 122 has the shape making the channel formed in the 'U' shape, the present invention is not limited to the 'U'-shape channel and any types of channels of the TFT having different shapes can be applicable.

Common electrodes 108, 108a, 108a' and pixel electrodes 118 are alternately formed to generate an in-plane field in the pixel area, and a pair of outermost common electrodes 108a and 108a' are formed at edges of the pixel area. Among the common electrodes 108, 108a, 108a', the outermost common electrodes 108a and 108a' overlap with a pair of lower storage electrodes 118a and 118a', respectively, to form first and second storage capacitors Cst1 and Cst2 with first and second insulating layers (not shown) interposed between the outermost common electrodes 108a and 108a' and the lower storage electrodes 118a and 118a'. Further, the common electrodes 108, 108a and 108a' and the pixel electrodes 118 are arranged to be substantially parallel to the data line 117.

The first and second storage capacitors Cst1 and Cst2 serve to uniformly maintain the voltage applied to a liquid crystal capacitor until a next signal is received. Besides maintaining the signal, the first and second storage capacitors Cst1 and Cst2 may also have the effects of stabilizing a gray scale representation, reducing flickering, reducing formation of residual images, and the like.

In the IPS mode LCD according to the first embodiment of the present invention, the outermost common electrodes 108a and 108a' and the storage electrodes 118a and 118a' are formed at the left and right edges of the pixel area to form the first and second storage capacitors Cst1 and Cst2, but the present invention is not limited to this arrangement of the outermost common electrodes 108a and 108a' and the storage electrodes 118a and 118a'. For example, the present invention can be applicable to a case where the storage electrode is formed only at one edge of the pixel area to form a single storage capacitor.

Here, a first connection line 108L is disposed at one end of the common electrodes 108, 108a and 108a', being substantially parallel to the gate line 116 and connecting the one end of the common electrodes 108, 108a and 108a'. A second connection line 118L is formed at one end of the pixel electrodes 118, connecting one side of the pixel electrodes 118, and is electrically connected with the drain electrode 123 and the pair of storage electrodes 118a and 118a' via a first contact hole 140a and a pair of second contact holes 140b and 140b', respectively, formed at the second insulating layer.

A common line 108l according to the first embodiment of the present invention is formed at a lower portion of an arbitrary common electrode 108 in the pixel area such that the common line 108l is substantially parallel to the data line 117. In this case, the common line 108l is made of the same conductive material as that of the data line 117 and formed on the layer on which the data line 117 is formed. In addition, the common line 108l is electrically connected with the first connection line 108L via a third contact hole 140c formed at the second insulating layer to supply a common voltage to the first connection line 108L and the common electrodes 108, 108a, 108a'.

Further, at an edge portion of the array substrate 110, there are formed a gate pad electrode 126p and a data pad electrode 127p electrically connected with the gate line 116 and the data line 117, respectively, and transferring a scan signal and a data signal applied from an external driving circuit unit to the gate line 116 and the data line 117. Namely, the data line 117 and the gate line 116 extend to the driving circuit unit so as to be connected with a data pad line 117p and a gate pad line 116p, respectively, and the data pad line 117p and the gate pad line 116p receive a data signal and a scan signal from the driving circuit unit via the data pad electrode 127p and the gate pad electrode 126p electrically connected via fourth and fifth contact holes 140d and 140e, respectively.

In the IPS mode LCD according to the first embodiment of the present invention constructed as described above, the common electrodes 108, 108a, 108a', the pixel electrodes 118, the first connection line 108L and the second connection line 118L are made of a transparent conductive material such as ITO (Indium Tin Oxide) or an IZO (Indium Zinc Oxide), so the aperture ratio can be improved.

In addition, because the common line 108l is formed to be substantially parallel to the data line 117, the line width of the common line 108l can be reduced, and thus, the aperture ratio of the pixel area can be improved by about 8% to 30%.

In addition, because the overall length of the common line 108l extending across the entire IPS mode LCD in the direction of the data line 117 is shorter than the overall length of the gate line 116 extending across the entire IPS mode LCD, the overall resistance of the common line 108l can be reduced. As a result, the common voltage can be stabilized to prevent degradation of picture quality such as ripples or flickers. In this case, the overall length of the common line 108l may be approximately 0.56 times the overall length of the gate line 116. For reference, in the related art IPS mode LCD, because the common line is formed in the direction horizontal to the liquid crystal panel, namely, in the direction substantially parallel to the gate line to increase RC delay to vary the common voltage of about 200 mV between both ends of the liquid crystal panel to cause ripples and flickers.

In addition, in the IPS mode LCD according to the first embodiment of the present invention, the common line 108l is formed such that it traverses the gate line 116 with the first insulating layer interposed the common line 108l and the gate line 116. Namely, the common line 108l is not formed near the gate line 116 nor on the same layer on which the gate line 116 is formed.

Rather, the common line 108l is formed such that it traverses the gate line 116 with the first insulating layer interposed the common line 108l and the gate line 116, and is disposed on the same layer on which the data line 117 is formed, thereby preventing a defect that the gate line 116 and the common line 108l are short-circuited and improving the production yield.

Here, in the IPS mode LCD according to the first embodiment of the present invention, the data wirings including the source electrode, the drain electrode, the data line and the data pad line, the common line, and the active pattern are simultaneously formed through a single masking process by using a half-tone mask or a slit mask (diffraction mask) (mentioning of the half-tone mask will also include the slit mask, hereinafter), whereby the array substrate can be fabricated by performing four masking processes. This will be described in detail through the following fabrication method of the IPS mode LCD. However, the present invention is not limited to the number of masking process. For example, the array substrate may also be fabricated by performing more than four or less than four processes.

FIGS. 4A to 4D are sectional views sequentially showing a fabrication process taken along line IIIa-IIIa'-IIIa", IIIb-IIIb, and IIIc-IIIc of the array substrate in FIG. 3.

The left side (IIIa-IIIa'-IIIa") shows the process of fabricating the array substrate of the pixel part including the data line area and the right side (IIIb-IIIb, and IIIc-IIIc) shows the sequential process of fabricating the array substrate of the data pad part and the gate pad part.

FIGS. 5A to 5D are plan views sequentially showing a fabrication process of the array substrate in FIG. 4.

Figure 4A:
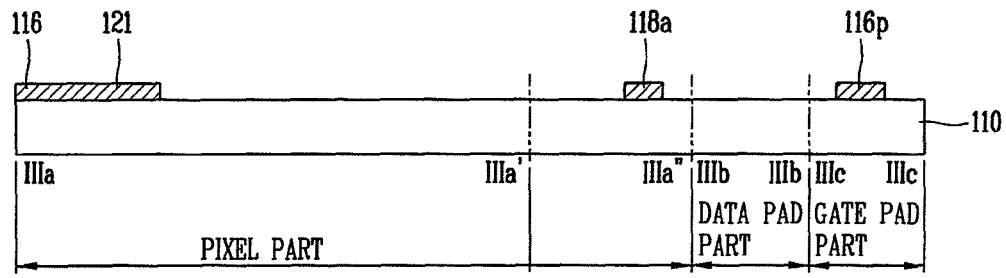
FIGS. 4A to 4D are sectional views sequentially showing a fabrication process taken along line IIIa-IIIa'-IIIa'', IIIb-IIIb, and IIIc-IIIc of the array substrate in FIG. 3.
Figure 5A:
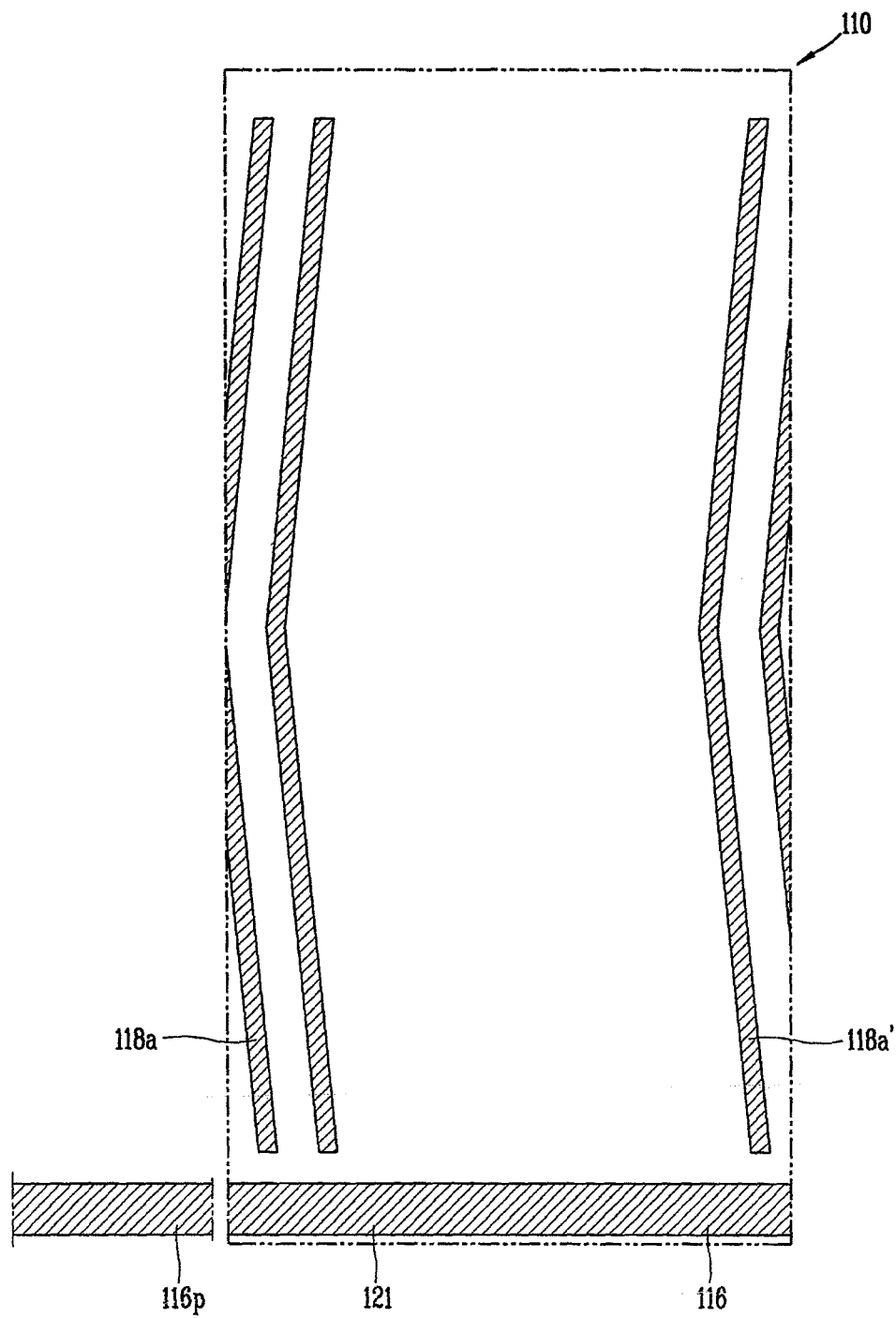
FIGS. 5A to 5D are plan views sequentially showing a fabrication process of the array substrate in FIG. 3.

As shown in FIGS. 4A and 5A, the gate electrode 121, the gate line 116, the first storage electrode 118a, the second storage electrode 118a', and the gate pad line 116p are formed at the pixel part of the array substrate 110 made of an insulation material such as glass. The first and second storage electrodes 118a and 118a' are formed to be bent at left and right edges of the pixel area, respectively, and arranged to be substantially perpendicular to the gate line 116. The gate electrode 121, the gate line 116, the first storage electrode 118a, the second storage electrode 118a', and the gate pad line 116p are formed by depositing a first conductive film on the entire surface of the array substrate 110 and selectively patterning it through a photolithography process (a first masking process). Here, the first conductive film may be made of a low-resistance conductive material such as aluminum (Al), an aluminum alloy, tungsten (W), copper (Cu), chromium (Cr), molybdenum (Mo), a molybdenum alloy, or the like. Also, the first conductive film may be formed with a multi-layered structure by stacking two or more low-resistance conductive materials.

Figure 4B:
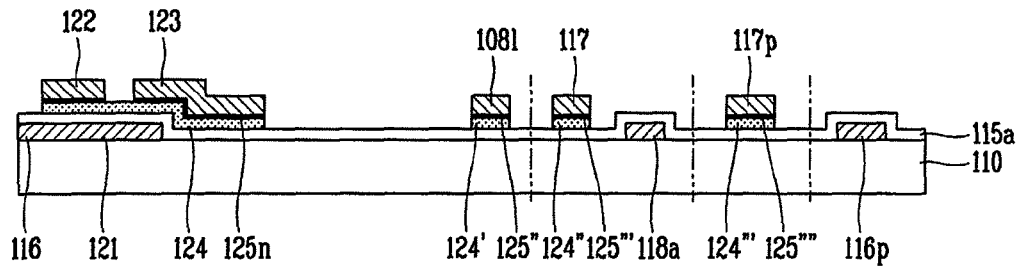
Figure 5B:
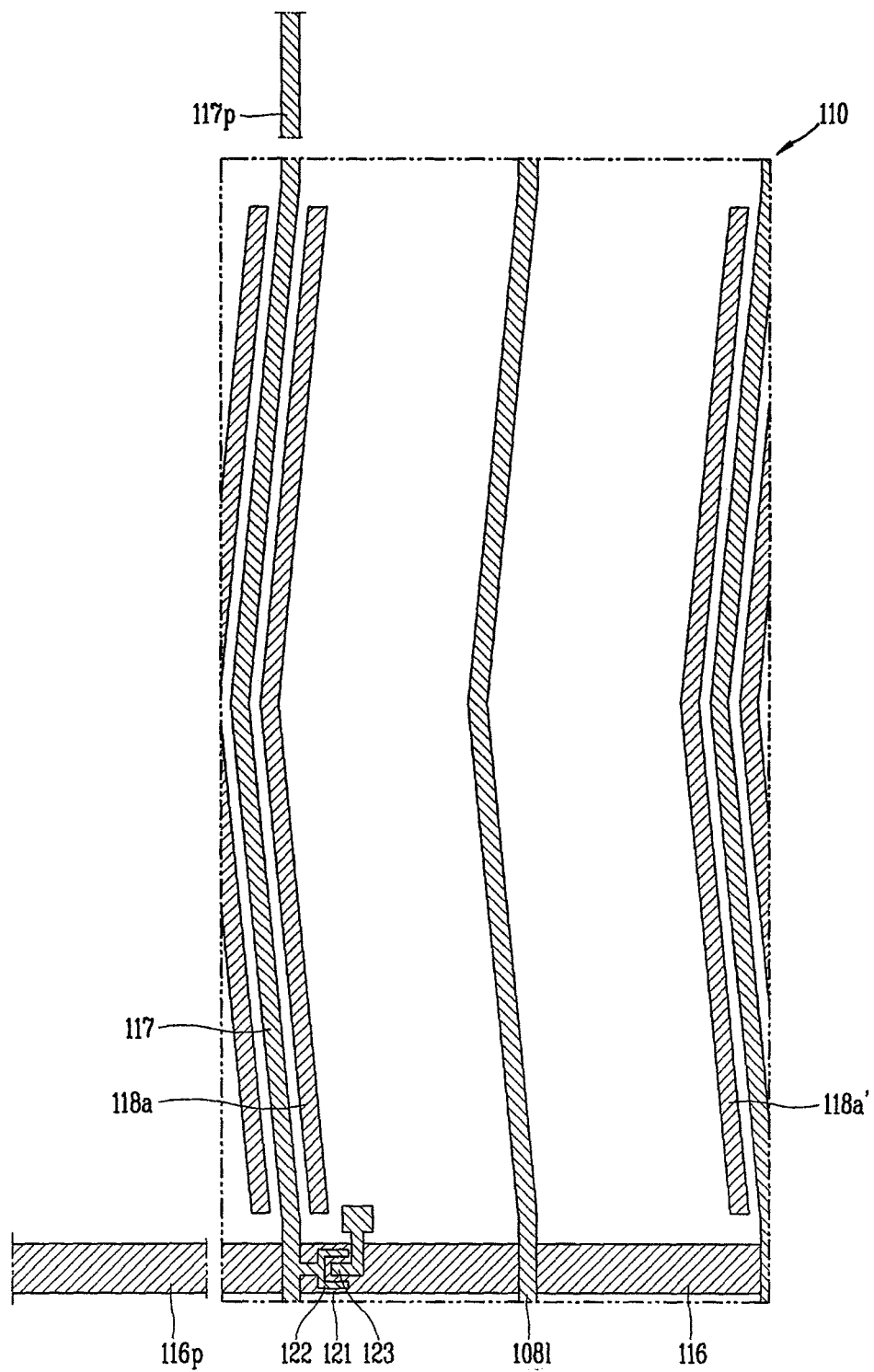

Next, as shown in FIGS. 4B and 5B, a first insulating layer 115a, an amorphous silicon thin film, an n+ amorphous silicon thin film, and a second conductive film are formed on the entire surface of the array substrate 110 with the gate electrode 121, the gate line 116, the first storage electrode 118a, the second storage electrode 118a' and the gate pad line 116p formed thereon, and are then selectively removed through a photolithography process (a second masking process) to form an active pattern 124 formed of the amorphous silicon thin film and the source and drain electrodes 122 and 123 formed of the second conductive film. The source and drain electrodes 122 and 123 are electrically connected with the source and drain regions of the active pattern 124 at the pixel part of the array substrate 110.

At this time, the data line 117 formed of the second conductive film is formed at the data line region of the array substrate 110 and the data pad line 117p formed of the second conductive film is formed at the data pad part of the array substrate 110 through the second masking process. Further, through the second masking process, the common line 108l formed of the second conductive film is formed within the pixel area, and the common line 108l is formed to be substantially parallel to the data line 117. In addition, an ohmic-contact layer 125n, which is formed of the n+ amorphous silicon thin film and has been patterned in the same shape as the source and drain electrodes 122 and 123, is formed on the active pattern 124.

A first amorphous silicon thin film pattern 124', a second n+ amorphous silicon thin film pattern 125", a second amorphous silicon thin film pattern 124", a third n+ amorphous silicon thin film pattern 125''', a third amorphous silicon thin film pattern 124''' and a fourth n+ amorphous silicon thin film pattern 125'''', which are formed of the amorphous silicon thin film and the n+ amorphous silicon thin film, are patterned in the same shape as the common line 108l, the data line 117 and the data pad line 117p, and are formed under the common line 108l, the data line 117 and the data pad line 117p.

Here, in the first embodiment of the present invention, the active pattern 124, the source and drain electrodes 122 and 123, the data line 117, the data pad line 117p and the common line 108l are simultaneously formed through the single masking process (the second masking process) by using a half-tone mask. The second masking process will now be described in detail with reference to the accompanying drawings.

FIGS. 6A to 6F are sectional views concretely showing the second masking process on the array substrate in FIGS. 4B and 5B according to a first embodiment of the present invention.

Figure 6A:
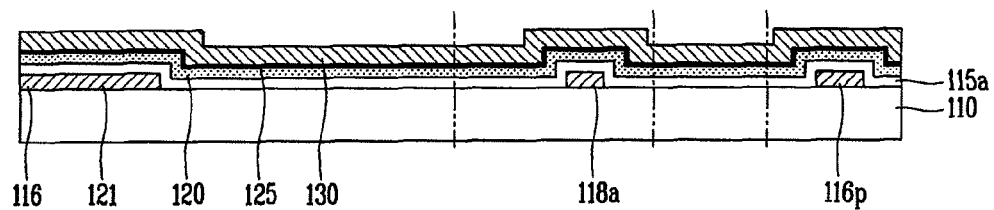
FIGS. 6A to 6F are sectional views concretely showing a second masking process formed on the array substrate in FIGS. 4B and 5B according to a first embodiment of the present invention.

As shown in FIG. 6A, the gate insulating layer 115a, the amorphous silicon thin film 120, an n+ amorphous silicon thin film 125, a second conductive film 130 are formed on the entire surface of the array substrate 110 with the gate electrode 121, the gate line 116, the first storage electrode 118a, the second storage electrode 118a', and the gate pad line 116p formed thereon. The second conductive film 130 may be made of a low-resistance conductive material such as aluminum (Al), an aluminum alloy, tungsten (W), copper (Cu), chromium (Cr), molybdenum (Mo), a molybdenum alloy, or the like, in order to form the source electrode, the drain electrode, the data line, the data pad line and the common line.

Figure 6B:
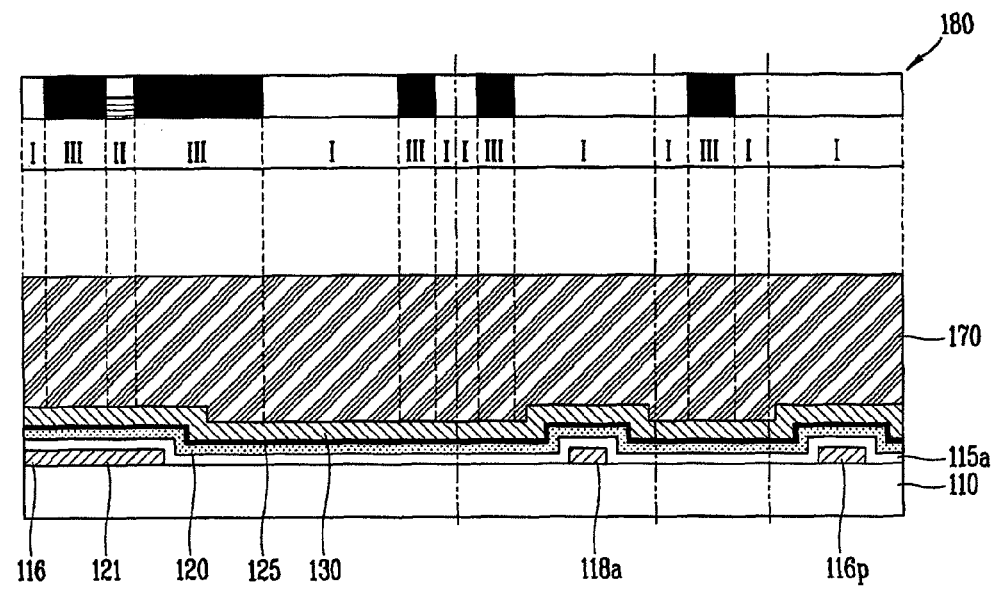

Next, as shown in FIG. 6B, a photosensitive film 170 made of a photosensitive material such as photoresist is formed on the entire surface of the array substrate 110, to which light is selectively irradiated via the half-tone mask 180 according to an embodiment of the present invention.

The half-tone mask 180 includes a first transmission region (I) that allows irradiated light to be entirely transmitted therethrough, a second transmission region (II) that allows only some of the irradiated light to be transmitted therethrough while blocking the remaining light, and a blocking region (III) that entirely blocks the irradiated light. Only the light which transmits through the half-tone mask 180 can be irradiated on the photosensitive film 170.

Figure 6C:
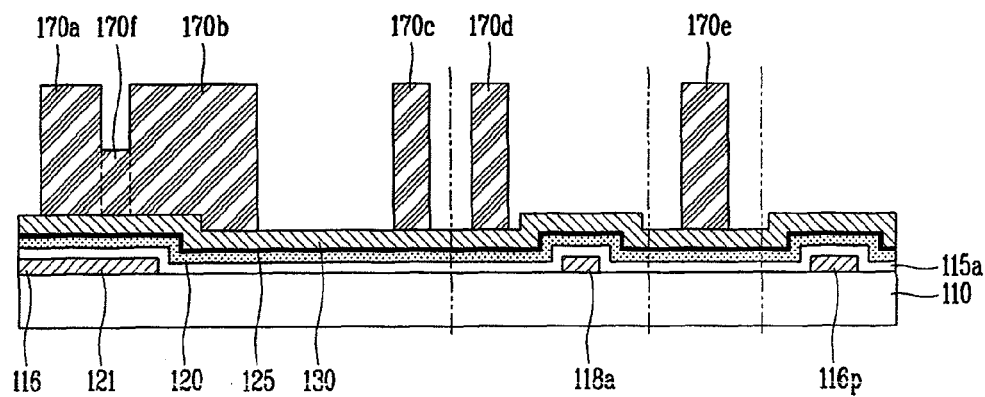

Subsequently, when the photosensitive film 170 which has been exposed through the half-tone mask 180 is developed, as shown in FIG. 6C, first to sixth photosensitive film patterns 170a to 170f remain at regions where the light has been entirely blocked or partially blocked through the blocking region (III) and the second transmission region (II), and the area of the photosensitive film at the transmission region (I) through which light had been entirely transmitted has been completely removed to expose the surface of the second conductive film 130. At this time, the first to fifth photosensitive film patterns 170a to 170e formed at the blocking region (III) are thicker than the sixth photosensitive film pattern 170c formed through the second transmission region (II). In addition, the photosensitive film at the region where the light had entirely transmitted through the first transmission region (I) has been completely removed. This is because positive photoresist has been used, but the present invention is not limited to using positive photoresist to accomplish this process. For example, negative photoresist can be also used in the present invention.

Figure 6D:
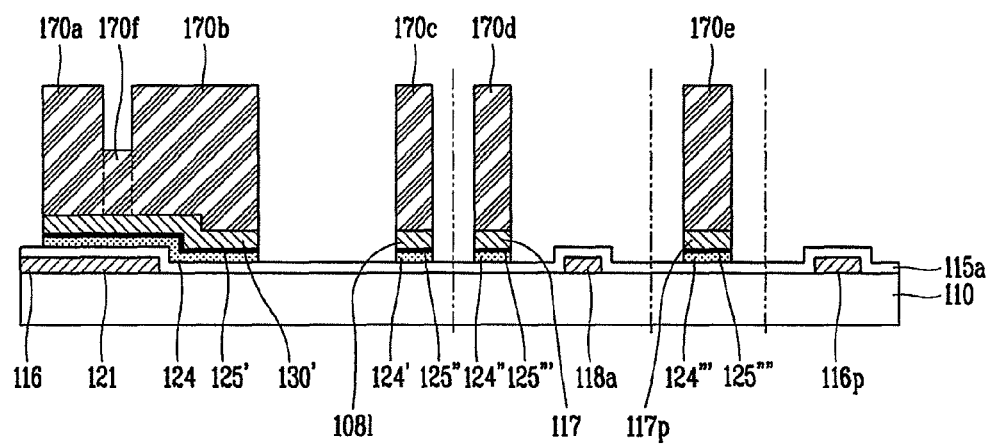

Then, as shown in FIG. 6D, the lower amorphous silicon thin film, the n+ amorphous silicon thin film, the n+ amorphous silicon thin film and the second conductive film are selectively removed by using the first to sixth photosensitive film patterns 170a to 170f to form the active pattern 124 at the pixel part of the array substrate 110 and the data line 117 formed of the second conductive film at the data line region of the array substrate 110. In addition, the data pad line 117p formed of the second conductive film is formed at the data pad part of the array substrate 110, and the common line 108l formed of the second conductive film is formed in the pixel area of the array substrate.

In the first embodiment of the present invention, only a single common line 108l is formed in the pixel area, but without being limited thereto, two or more common lines may be formed.

At this time, the first amorphous silicon thin film pattern 125' and the second conductive film pattern 130', which are formed of the n+ amorphous silicon thin film and the second conductive film, respectively, and have been patterned in the same shape as the active pattern 124, are formed on the active pattern 124. Further, the first amorphous silicon thin film pattern 124', the second n+ amorphous silicon thin film pattern 125'', the second amorphous silicon thin film pattern 124'', the third n+ amorphous silicon thin film pattern 125''', the third amorphous silicon thin film pattern 124m, and the fourth n+ amorphous silicon thin film pattern 125'''', which are formed of the amorphous silicon thin film and the n+ amorphous silicon thin film, are patterned in the same shape as the common line 108l, the data line 117 and the data pad line 117p, and are formed under the common line 108l, the data line 117, and the data pad line 117p.

Figure 6E:
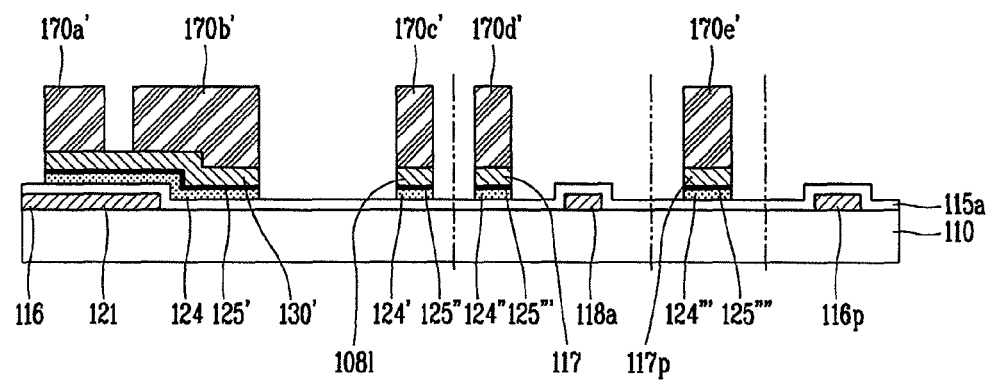

Thereafter, an ashing process is performed to partially remove the first to sixth photosensitive film patterns 170a to 170f. Then, as shown in FIG. 6E, the sixth photosensitive film pattern 170f at the second transmission region (II) is completely removed, exposing the second conductive pattern 130' at the second transmission region (II).

Then, the first to fifth photosensitive film patterns remain as seventh to eleventh photosensitive film patterns 170a' and 170e' after partially removing the first to sixth photosensitive film patterns 170a to 170f by the thickness of the sixth photosensitive film pattern only on source and drain electrode regions, the common line 108l, the data line 117, and the data pad line 117p corresponding to the blocking region (III).

Figure 6F:
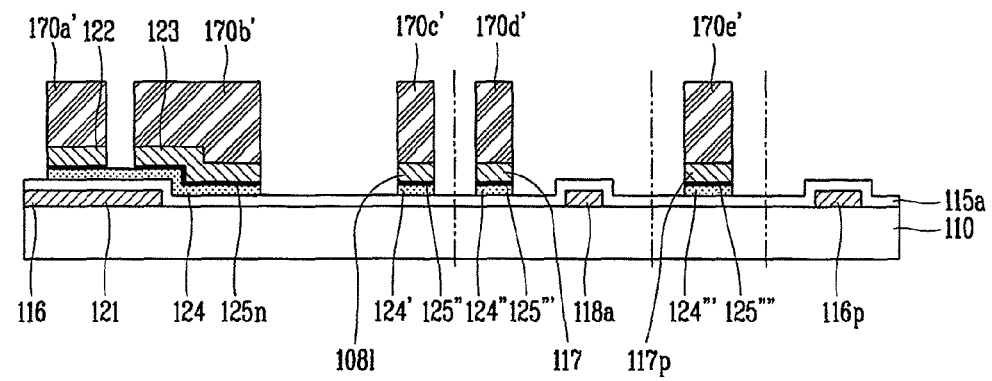

Thereafter, as shown in FIG. 6F, portions of the first n+ amorphous silicon thin film pattern and the second conductive film pattern are selectively removed by using the remaining seventh to eleventh photosensitive film patterns 170a' to 170e' as masks to form the source electrode 122 and the drain electrode 123 formed of the second conductive film at the pixel part of the array substrate 110. At this time, an ohmic-contact layer 125n formed of the n+ amorphous silicon thin film and allowing the source and drain regions of the active pattern 124 and the source and drain electrodes 122 and 123 to ohmic-contact with each other is formed on the active pattern 124.

In this manner, in the first embodiment of the present invention, the active pattern 124, the source and drain electrodes 122 and 123, the data line 117, the data pad line 117p and the common line 108l can be formed through a single masking processing by using the half-tone mask.

Figure 4C:
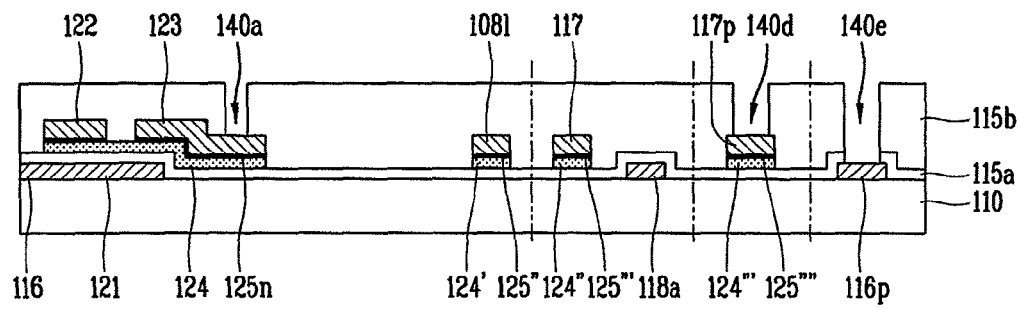
Figure 5C:
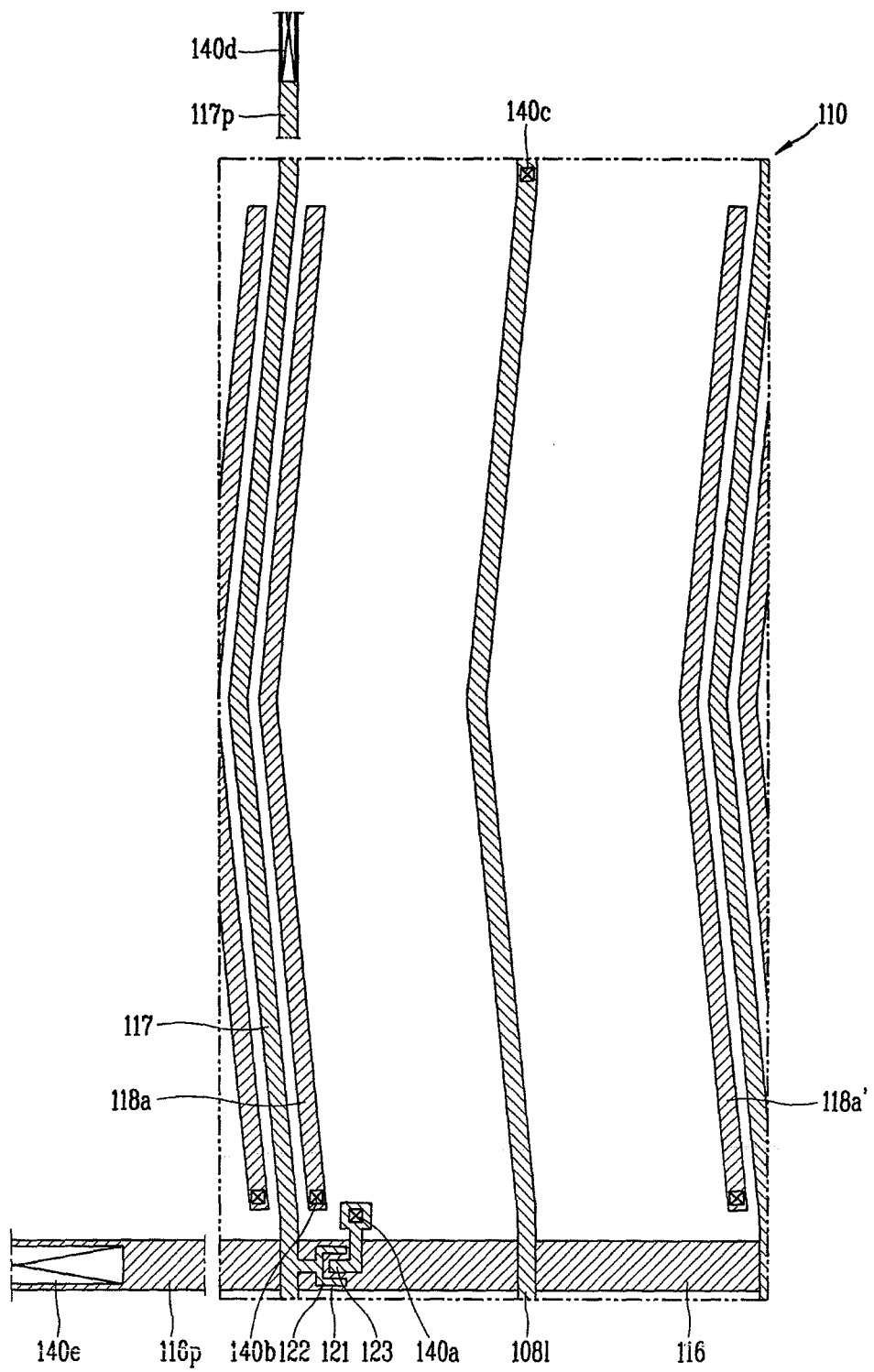

Thereafter, as shown in FIGS. 4C and 5C, a second insulating layer 115b is formed on the entire surface of the array substrate 110 with the active pattern 124, the source and drain electrodes 122 and 123, the data line 117, the data pad line 117p and the common line 108l formed thereon.

Then, portions of the second insulating layer 115b is selectively removed by using a photolithography process (a third masking process) to form the first contact hole 140a exposing a portion of the drain electrode 123 and the pair of second contact holes 140b and 140b' exposing portions of the first and second storage electrodes 118a and 118a'. In addition, portions of the second insulating layer 115b are selectively removed by using the third masking process to form the third contact hole 140c, the fourth contact hole 140d, and a fifth contact hole 140e exposing portions of the common line 108l, the data pad line 117p and the gate pad line 116p, respectively.

Figure 4D:
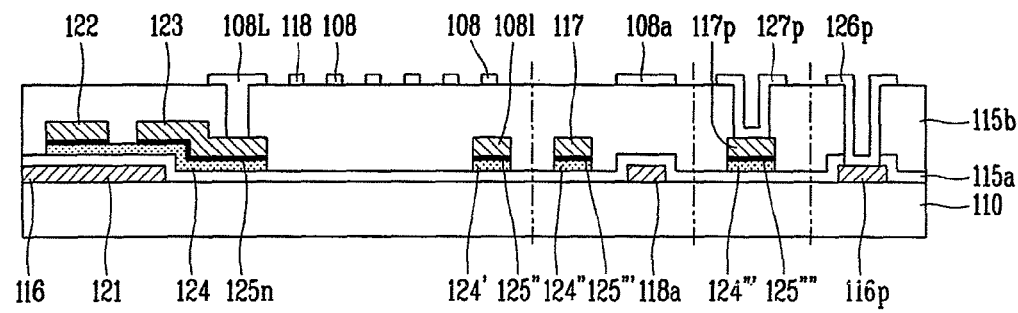
Figure 5D:
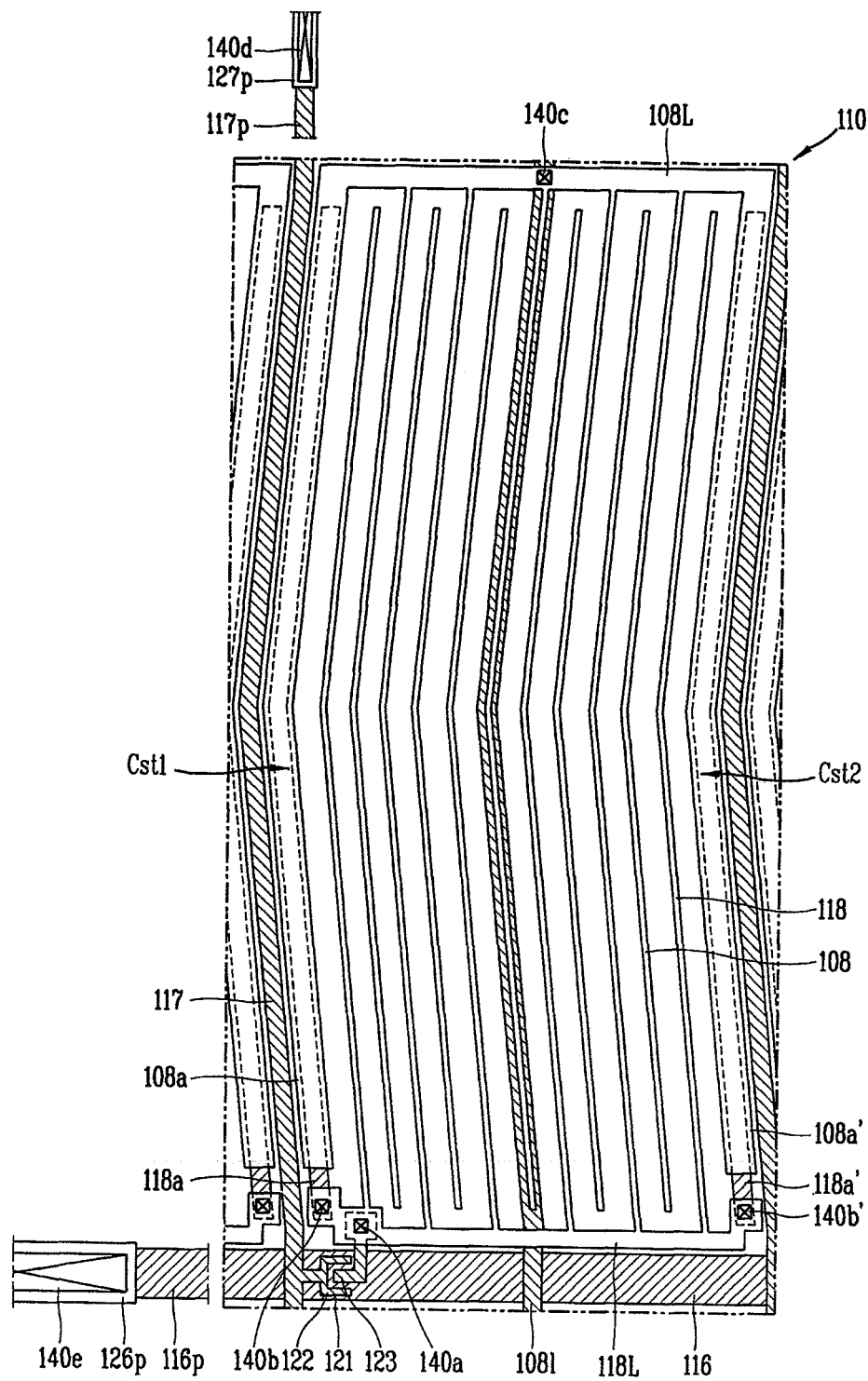

Thereafter, as shown in FIGS. 4D and 5D, a third conductive film made of a transparent conductive film is formed on the entire surface of the array substrate 110 with the first to fifth contact holes 140a to 140e formed thereon. Then, the third conductive film is selectively removed through a photolithography process (a fourth masking process) to form the second connection line 118L electrically connected with the drain electrode 123 via the first contact hole 140a and electrically connected with the first and second storage electrodes 118a and 118a' via the pair of second contact holes 140b and 140b'. In addition, by selectively removing the third conductive film through the fourth masking process, the plurality of common electrodes 108, 108a, 108a' and the pixel electrodes 118 are formed on the second insulating layer 115b to be alternately disposed in the pixel area to generate an in-plane field. Further, by selectively removing the third conductive film through the fourth masking process, the data pad electrode 127p and the gate pad electrode 126p are formed to be electrically connected with the data pad line 117p and the gate pad line 116p via the fourth and fifth contact holes 140d and 140e, respectively.

In this case, the first and second outermost common electrodes 108a and 108a' are formed at the edges of the pixel area. Among the common electrodes 108, 108a and 108a', the first and second outermost common electrodes 108a and 108a' overlap with the lower first and second storage electrodes 118a and 118a', respectively, to form the first and second storage capacitors Cst1 and Cst2 with the first and second insulating layers 115a and 115b interposed between the outermost common electrodes 108a and 108a' and the lower storage electrodes 118a and 118a'. Further, through the fourth masking process, the first connection line 108L is formed at one end of the common electrodes 108, 108a and 108a' such that it is substantially parallel to the gate line 116 and connects the one end of the common electrodes 108, 108a and 108a'.

The common line 108l in the first embodiment of the present invention is formed under an arbitrary common electrode 108 in the pixel area such that the common line 108l is substantially parallel to the data line 117. the common line 108l is electrically connected with the first connection line 108L via the third contact hole 140c formed at the second insulating layer 115b to supply the common voltage to the first connection line 108L and the common electrodes 108, 108a, and 108a'. In addition, the third conductive film contains a transparent conductive material having good transmittance such as an ITO (Indium Tin Oxide) or IZO (Indium Zinc Oxide) to form the common electrodes 108, 108a, 108a', the first connection line 108L, the second connection line 118L, and the pixel electrodes 118.

As described above, in the IPS mode LCD according to the first embodiment of the present invention, the common electrodes 108, 108a, 108a', the pixel electrodes 118, the first connection line 108L, and the second connection line 118L are made of a transparent conductive material and the common line 108*l* is formed to be substantially parallel to the data line 117, whereby the line width of the common line 108*l* can be reduced and accordingly, the aperture ratio of the pixel area can be improved by about 8% to 30%. In addition, because the common line 108*l* is formed to be parallel to the common electrode 108 at the lower side of the common electrode 108, the aperture region can be extended to its maximum level.

In addition, as described above, because the overall length of the common line 108*l* extending across the entire IPS mode LCD in the direction of the data line 117 is shorter than the overall length of the gate line 116 extending across the entire IPS mode LCD, the overall resistance of the common line 108*l* can be reduced. As a result, the common voltage can be stabilized to prevent degradation of picture quality such as ripples or flickering. In this case, the overall length of the common line 108*l* may be approximately 0.56 times the overall length of the gate line 116.

In addition, because the common line 108*l* is formed to traverse the gate line 116 with the first insulating layer interposed therebetween, the gate line 116 and the common line 108*l* can be prevented from being short-circuited, improving the production yield.

In the IPS mode LCD according to the first embodiment of the present invention, because the common electrodes 108, 108*a*, 108*a'*, the pixel electrodes 118, the data line 117 are bent to have the multi-domain structure allowing liquid crystal molecules to be symmetrically driven, abnormal light caused by birefringence characteristics of liquid crystal can be canceled out to minimize a color shift phenomenon. Namely, the color shift phenomenon occurs according to a visual field for viewing liquid crystal molecules due to the birefringence characteristics of the liquid crystal molecules, and in particular, a yellow shift is observed in a short axis direction of the liquid crystal molecules, and a blue shift is observed in a longer axis direction of the liquid crystal molecules. Thus, the birefringence value can be compensated by appropriately disposing the shorter and longer axis of the liquid crystal molecules to reduce or remove the color shift.

Figure 7:
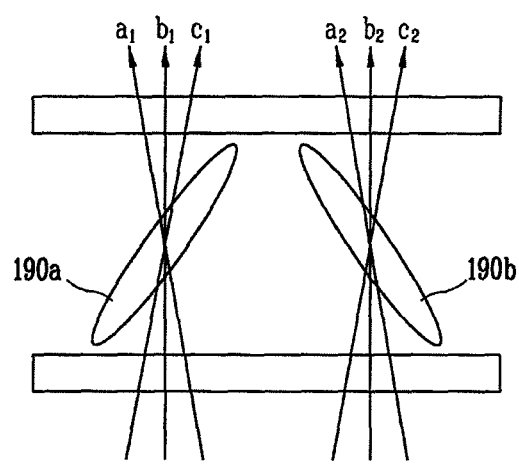
FIG. 7 is a view sequentially showing a viewing angle compensation principle in the IPS mode LCD according to an embodiment of the present invention.

For example, in case of the two-domain structure in which liquid crystal molecules are symmetrically arranged, as shown in FIG. 7, a birefringence value of a1 of the first liquid crystal molecule 190*a* is compensated by that of a2 of a second liquid crystal molecule 190*b* having a molecule arrangement in the opposite direction of the first liquid crystal molecule 190*a*, resulting in a birefringence value 0. In addition, a birefringence value of c1 is compensated by c2. Accordingly, the color shift phenomenon due to the birefringence characteristics of the liquid crystal molecules can be minimized to prevent degradation of picture quality according to the viewing angle.

Here, in the IPS mode LCD according to the first embodiment of the present invention, the single common line is formed in the pixel area, but the present invention is not limited thereto. Namely, two or more common lines may be designed according to resistance of the common lines. An IPS mode LCD having two common lines according to a second embodiment of the present invention will now be described in detail with reference to FIG. 8.

Figure 8:
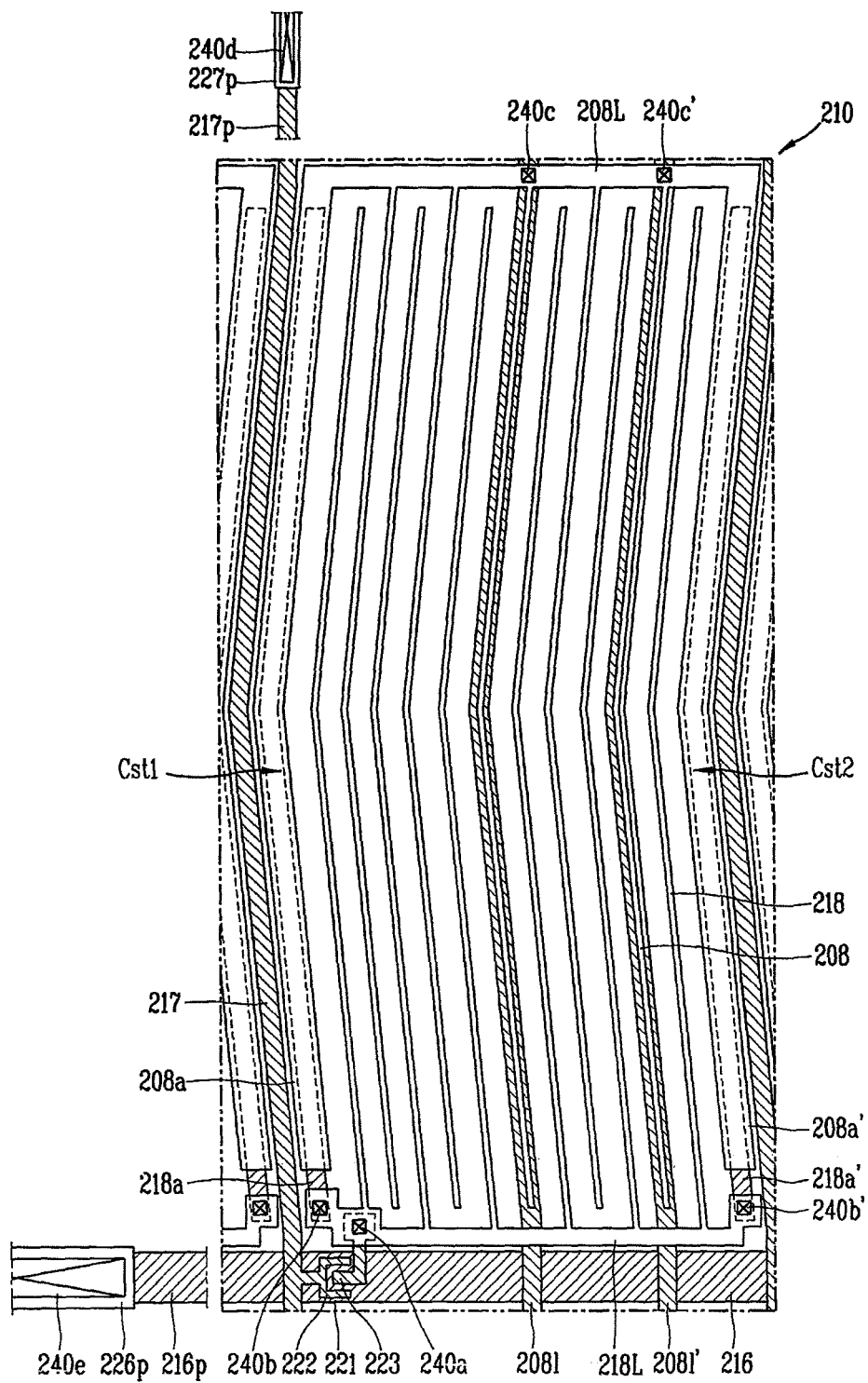
FIG. 8 is a plan view sequentially showing a portion of an array substrate of an IPS mode LCD according to a second embodiment of the present invention.

FIG. 8 is a plan view sequentially showing a portion of an array substrate of an IPS mode LCD according to a second embodiment of the present invention, which includes the same elements as those of the array substrate of the IPS mode LCD according to the first embodiment of the present invention, except that it includes two common lines.

As illustrated, in the second embodiment of the present invention, gate lines 216 and data lines 217 are formed to be arranged vertically and horizontally, respectively, to define a pixel region on an array substrate 210, and a TFT (T), a switching element, is formed at a crossing of the gate line 216 and the data line 217.

The TFT (T) includes a gate electrode 221 forming a portion of the gate line 216, a source electrode 222 connected with the data line 217 and a drain electrode 223 connected to a pixel electrode 218. The TFT (T) further includes a first insulating layer (not shown) for insulating the gate electrodes 221 and the source and drain electrodes 222 and 223, and an active pattern (not shown) forming a conductive channel between the source and drain electrodes 222 and 223 by a gate voltage supplied to the gate electrode 221.

Common electrodes 208, 208*a*, 208*a'* and pixel electrodes 218 are alternately formed to generate an in-plane field in the pixel area, and a pair of outermost common electrodes 208*a* and 208*a'* are formed at edges of the pixel area. Among the common electrodes 208, 208*a* and 208'*a*, the outermost common electrodes 208*a* and 208*a'* overlap with a pair of lower storage electrodes 218*a* and 218*a'*, respectively, to form first and second storage capacitors Cst1 and Cst2 with first and second insulating layers (not shown) interposed between the outermost common electrodes 208*a* and 208*a'* and the lower storage electrodes 218*a* and 218*a'*. Further, the common electrodes 208, 208*a* and 208*a'* and the pixel electrodes 218 are arranged to be substantially parallel to the data line 217.

Here, a first connection line 208L is disposed at one end of the common electrodes 208, 208*a* and 208*a'*, being substantially parallel to the gate line 216 and connecting the one end of the common electrodes 208, 208*a* and 208*a'*. A second connection line 218L is formed at one end of the pixel electrodes 218, connecting one side of the pixel electrodes 218, and is electrically connected with the drain electrode 223 and the pair of storage electrodes 218*a* and 218*a'* via a first contact hole 240*a* and a pair of second contact holes 240*b* and 240*b'*, respectively, formed at the second insulating layer. First and second common lines 208*l* and 208*l'* according to the second embodiment of the present invention are formed at a lower portion of an arbitrary common electrode 208 in the pixel area such that the first and second common lines 208*l* and 208*l'* are substantially parallel to the data line 217. In this case, the first and second common lines 208*l* and 208*l'* are made of the same conductive material as that of the data line 217 and formed on the layer on which the data line 217 is formed. In addition, the first and second common lines 208*l* and 208*l'* are electrically connected with the first connection line 208L via third contact holes 240*c* and 240*c'*, respectively, formed at the second insulating layer to supply a common voltage to the first connection line 208L and the common electrodes 208, 208*a*, 208*a'*.

Further, at an edge portion of the array substrate 210, there are formed a gate pad electrode 226*p* and a data pad electrode 227*p* electrically connected with the gate line 216 and the data line 217, respectively, and transferring a scan signal and a data signal applied from an external driving circuit unit to the gate line 216 and the data line 217. Namely, the data line 217 and the gate line 216 extend to the driving circuit unit so as to be connected with a data pad line 217*p* and a gate pad line 216*p*, respectively, and the data pad line 217*p* and the gate pad line 216*p* receive a data signal and a scan signal from the driving circuit unit via the data pad electrode 227*p* and the gate pad electrode 226*p* electrically connected via fourth and fifth contact holes 240*d* and 240*e*.

In addition, as described above, the IPS mode LCD according to the first and second embodiments of the present invention, the first and second outermost common electrodes and the first and second storage electrodes are formed at left and right edge portions of the pixel area to form the first and second storage capacities, but without being limited thereto, the present invention can be applicable to a case where the storage electrode is formed only at one edge portion of the pixel area to form only a single storage capacitor.

Figure 9:
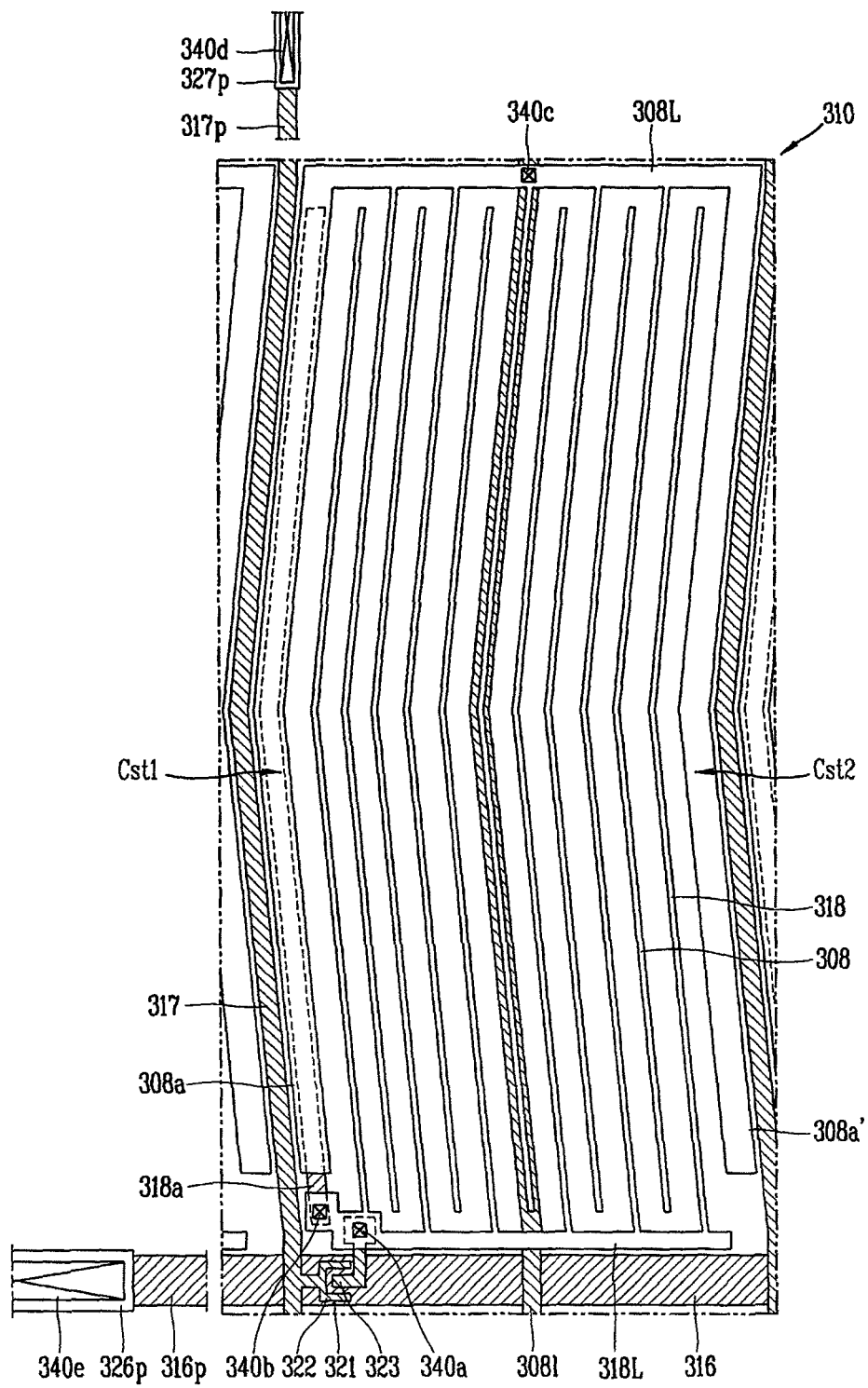
FIG. 9 is a plan view sequentially showing a portion of an array substrate of an IPS mode LCD according to a third embodiment of the present invention.

FIG. 9 is a plan view sequentially showing a portion of an array substrate of an IPS mode LCD according to a third embodiment of the present invention, which includes the same elements as those of the array substrate in the IPS mode LCD according to the first embodiment of the present invention, except that one of the storage electrodes is formed only at edge portion of the pixel area to form a single storage capacitor.

As illustrated, in the third embodiment of the present invention, gate lines 316 and data lines 317 are formed to be arranged vertically and horizontally to define a pixel region on an array substrate 310, and a TFT (T), a switching element, is formed at a crossing of the gate line 316 and the data line 317.

The TFT (T) includes a gate electrode 321 forming a portion of the gate line 316, a source electrode 322 connected with the data line 317 and a drain electrode 323 connected to a pixel electrode 318. The TFT (T) further includes a first insulating layer (not shown) for insulating the gate electrodes 321 and the source and drain electrodes 322 and 323, and an active pattern (not shown) forming a conductive channel between the source and drain electrodes 322 and 323 by a gate voltage supplied to the gate electrode 321.

Common electrodes 308, 308a, 308a' and pixel electrodes 318 are alternately formed to generate an in-plane field in the pixel area, and an outermost common electrode 308a is formed at a left edge of the pixel area Among the common electrodes 308, 308a and 308a', the outermost common electrode 308a overlaps with a lower storage electrode 318a to form a storage capacitor Cst with first and second insulating layers (not shown) interposed between the outermost common electrode 308a and the lower storage electrode 318a.

In the IPS mode LCD according to the third embodiment of the present invention, because the storage electrode 318a is formed only at one edge of the pixel electrode, the aperture ratio of the pixel area can be further improved.

Here, a first connection line 308L disposed at one end of the common electrodes 308, 308a and 308a', being substantially parallel to the gate line 316 and connecting the one end of the common electrodes 308, 308a and 308a'. A second connection line 318L is formed at one end of the pixel electrodes 318, connecting one side of the pixel electrodes 318, and electrically connected with the drain electrode 323 and the storage electrode 318a via first and second contact holes 340a and 340b formed at the second insulating layer.

A common line 308l according to the third embodiment of the present invention is formed at a lower portion of an arbitrary common electrode 308 in the pixel area such that the common line 308l is substantially parallel to the data line 317. In this case, the common line 308l is electrically connected with the first connection line 308L via a third contact hole 340c formed at the second insulating layer to supply a common voltage to the first connection line 308L and the common electrodes 308, 308a, 308a'.

Further, at an edge portion of the array substrate 310, there are formed a gate pad electrode 326p and a data pad electrode 327p electrically connected with the gate line 316 and the data line 317, respectively, and transferring a scan signal and a data signal applied from an external driving circuit unit to the gate line 316 and the data line 317. Namely, the data line 317 and the gate line 316 extend to the driving circuit unit so as to be connected with a data pad line 317p and a gate pad line 316p, respectively, and the data pad line 317p and the gate pad line 316p receive a data signal and a scan signal from the driving circuit unit via the data pad electrode 327p and the gate pad electrode 326p electrically connected via fourth and fifth contact holes 340d and 340e.

The array substrates according to the first to third embodiments of the present invention may be attached with color filter substrates in a facing manner by means of a sealant applied to outer edges of the image display part. Then, the color filter substrates include black matrixes for preventing leakage of light to the TFTs, the gate lines and the data lines, and color filters for implementing red, green and blue colors. However, the present invention is not limited to applying the color filter substrates as discussed above, but rather other methods or structure can be used to generate color. The attachment of the color filter substrates and the array substrates may be made through attachment keys formed on the color filter substrates or the array substrates. However, the attachment of the color filter substrates and the array substrates can be made via other means.

The present invention can be also applied to various other devices fabricated by using TFTs, for example, an OLED (Organic Light Emitting Diode) display device in which OLEDs are connected with driving transistors.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for fabricating an in-plane switching (IPS) type liquid crystal display (LCD) device, comprising:
   forming gate lines arranged in a first direction and data lines arranged in a second direction substantially perpendicular to the first direction, the gate lines and the data lines defining pixel regions on an array substrate;
   forming a storage electrode on the array substrate;
   forming common electrodes extending across each pixel region;
   forming pixel electrodes arranged to be substantially parallel to the common electrodes, the common electrodes and the pixel electrodes being alternately arranged to generate an in-plane field in each pixel region;
   forming thin film transistors (TFTs) at intersection areas of the gate lines and the data lines, each TFT including a source electrode connected to the corresponding data line, a drain electrode connected to the corresponding pixel electrode and a gate electrode; and
   forming a common line under one of the common electrodes in the pixel region, the common line being substantially parallel to the data lines,
   wherein the common line is underneath the respective common electrode to overlap the common electrode, and
   wherein the common line and the data lines are formed on a first insulating layer on the array substrate with the gate electrode, the gate line and the storage electrode formed thereon.

2. The method of claim 1, wherein the gate lines, the storage electrode, and a gate pad line are formed by depositing a first conductive film on a surface of the array substrate and selectively patterning the first conductive film through a first photolithography process.

3. The method of claim 1, wherein the source and drain electrodes, the common line, the data line and a data pad line are formed by forming the first insulating layer, an amorphous silicon thin film, an n+ amorphous silicon thin film, and a second conductive film on a surface of the array substrate with the gate electrode, the gate line, the storage electrode and a gate pad line formed thereon, and then selectively removing the amorphous silicon thin film, the n+ amorphous silicon thin film, and the second conductive film through a second photolithography process.

4. The method of claim 1, wherein a plurality of contact holes exposing portions of the drain electrode, the storage electrode, the common line, a data pad line and a gate pad line are formed by forming a second insulating layer on a surface of the array substrate with an active pattern, the source and drain electrodes, the data line, a data pad line and the common line formed thereon, and then selectively removing the second insulating layer through a third photolithography process.

5. The method of claim 1, wherein the common electrodes, the pixel electrodes, a first and second connection lines, a data pad electrode and a gate pad electrode are formed on a second insulating layer by forming a third conductive film made of a transparent conductive film on a surface of the array substrate with first to fifth contact holes formed thereon, and then selectively removing the third conductive film through a fourth photolithography process.

6. The method of claim 1, wherein the common line traverses one of the gate lines.

7. The method of claim 1, wherein the common line and the common electrodes are made of a same transparent material.

8. A method for fabricating an in-plane switching (IPS) mode liquid crystal display (LCD) device, comprising:
    forming a gate electrode and a gate line on a first substrate;
    forming a first insulating layer on the first substrate;
    forming an active pattern on the first substrate;
    forming source and drain electrodes on the first substrate and forming an data line crossing the gate line to define a pixel area;
    forming a storage electrode on the first substrate;
    forming at least one common line in a direction substantially parallel to the data line within the pixel area of the first substrate;
    forming a second insulating layer on the first substrate; and
    forming a plurality of common electrodes and pixel electrodes alternately disposed within the pixel area of the first substrate to generate an in-plane field, such that at least one common electrode is positioned over an upper portion of the common line,
    wherein the common line is underneath the respective common electrode to overlap the common electrode, and
    wherein the common line and the data lines are formed on the first insulating layer on the first substrate with the gate electrode, the gate line and the storage electrode formed thereon.

9. The method of claim 8, further comprising:
    forming a first connection line such that the first connection line is arranged to be substantially parallel to the gate line and connects one side of the common electrodes; and
    forming a second connection line such that the second connection line is arranged to be substantially parallel to the gate line and connects one side of the pixel electrodes.

10. The method of claim 9, wherein the second connection line is electrically connected with the drain electrode via a first contact hole and electrically connected with the storage electrode via a second contact hole.

11. The method of claim 8, wherein the gate electrode, the gate line and the storage electrode are formed of a first conductive film, and wherein the source and drain electrodes, the data line and the common line are formed of a second conductive film.

12. The method of claim 8, wherein the storage electrode is formed at an edge of pixel area of the first substrate in a direction substantially parallel to the data line, and overlapping with the common electrode with the first and second insulating layers interposed therebetween to form a storage capacitor.

13. The method of claim 8, wherein the common line traverses the gate line.

14. The method of claim 8, wherein the common line and the common electrodes are made of a same transparent material.

* * * * *